United States Patent
Nye et al.

(10) Patent No.: US 10,902,359 B2
(45) Date of Patent: Jan. 26, 2021

(54) MANAGEMENT OF MULTI-SITE DASHBOARDS

(71) Applicant: Vivint, Inc., Provo, UT (US)

(72) Inventors: James Ellis Nye, Alpine, UT (US); Jeremy B. Warren, Draper, UT (US); Matthew J. Eyring, Provo, UT (US); Jungtaik Hwang, Draper, UT (US)

(73) Assignee: Vivint, Inc., Provo, UT (US)

( * ) Notice: Subject to any disclaimer, the term of this patent is extended or adjusted under 35 U.S.C. 154(b) by 655 days.

(21) Appl. No.: 14/231,489

(22) Filed: Mar. 31, 2014

(65) Prior Publication Data
US 2015/0278720 A1 Oct. 1, 2015

(51) Int. Cl.
*G06Q 10/06* (2012.01)

(52) U.S. Cl.
CPC ................ *G06Q 10/063* (2013.01)

(58) Field of Classification Search
CPC .. G06Q 10/087; G06Q 10/0833; G06Q 10/08; G06Q 20/20; G06Q 30/0613; G06Q 20/203; G06Q 20/32
See application file for complete search history.

(56) References Cited

U.S. PATENT DOCUMENTS

| | | | | |
|---|---|---|---|---|
| 5,742,931 A * | 4/1998 | Spiegelhoff | ...... | G06Q 10/06315 705/26.61 |
| 6,067,477 A * | 5/2000 | Wewalaarachchi | .. | G05B 19/418 700/17 |
| 6,353,853 B1 * | 3/2002 | Gravlin | ................ | H04L 41/22 702/188 |
| 8,290,627 B2 * | 10/2012 | Richards | ................ | H04L 67/12 700/276 |
| 2007/0024708 A1 * | 2/2007 | Lin | ........................ | H04N 7/181 348/143 |
| 2007/0033129 A1 * | 2/2007 | Coates | ................... | G06Q 40/06 705/36 R |
| 2007/0055757 A1 * | 3/2007 | Mairs | .................... | H04L 12/281 709/223 |
| 2008/0183599 A1 * | 7/2008 | Hill | ........................ | G06Q 99/00 705/28 |
| 2008/0312978 A1 * | 12/2008 | Binney | .................. | G06Q 10/06 705/28 |
| 2009/0048884 A1 * | 2/2009 | Olives | .................... | G06Q 40/12 705/7.33 |
| 2009/0055353 A1 * | 2/2009 | Meema | ................... | H04L 12/10 |
| 2009/0138371 A1 * | 5/2009 | McGee | .................. | G06Q 30/06 705/26.2 |
| 2010/0286937 A1 * | 11/2010 | Hedley | .................. | G06Q 30/02 702/60 |
| 2012/0296682 A1 * | 11/2012 | Kumar | .................... | G06Q 10/00 705/7.11 |
| 2013/0268127 A1 * | 10/2013 | Casilli | ................... | G05D 23/19 700/276 |

\* cited by examiner

*Primary Examiner* — Renae Feacher
(74) *Attorney, Agent, or Firm* — Holland & Hart, LLP

(57) ABSTRACT

A computer-implemented method for monitoring commercial activities is described. In one embodiment, the method includes receiving information related to commercial activities at at least one of a plurality of locations, the information being collected at the at least one of a plurality of locations, and transmitting the collected information for at least one of the plurality of locations to a device located remote from at least one of the plurality of locations.

23 Claims, 12 Drawing Sheets

MANAGEMENT OF MULTI-SITE DASHBOARDS

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor an aspect of a home or business. Information related to one location, however, may not be readily available at another location.

SUMMARY

According to at least one embodiment, a computer-implemented method for monitoring at least one commercial activity. In at least one embodiment, the method includes receiving information related to commercial activities at at least one of a plurality of locations, the information being collected at the at least one of a plurality of locations, and transmitting the collected information for at least one of the plurality of locations to a device located remote from at least one of the plurality of locations.

In other embodiments, the method may include transmitting instructions to at least one of the plurality of locations in response to the displayed information. The method may include transmitting the collected information for a select one of the plurality of locations to a local device located on site at the select one of the plurality of locations, wherein the local device displays the collected information. The collected information may be stored in a database located remote from the plurality of locations. The collected information displayed on the device may be received from the database. The information may be collected via a manual entering of information about at least one commercial activity. The collected information about at least one commercial activity may be automatically detected. The commercial activity may include at least one of: consumer traffic, product inventory, duration of tasks, number of transactions, and number of employees. The method may include comparing the collected information from one of the plurality of locations with collected information from at least one other of the plurality of locations. The method may include transmitting instructions to perform a separate commercial activity in response to the collected information indicating a threshold condition is met. The method may include automatically generating instructions when the threshold condition is met.

Another embodiment is directed to a computer-program product for monitoring commercial activities. The computer-program product includes a non-transitory computer-readable medium storing instructions executable by a processor to receive information related to commercial activities at at least one of a plurality of locations, the information being collected at the at least one of the plurality of locations, transmit the information for at least one of the plurality of locations to a remote device located remotely from the at least one of the plurality of locations, and display at least some of the information for the at least one of the plurality of locations on a local device located at the at least one of the plurality of locations.

In one embodiment, information is received for a plurality of locations. The instructions may be executable to display information from each of the plurality of locations on the local device. Displaying the collected information on the local device may include displaying collected information for only the location where the local device resides. The instructions may be executable to transmit instructions to perform a further commercial activity in response to the information.

A further embodiment is directed to an apparatus for monitoring at least one commercial activity. The apparatus includes a processor, a memory in electronic communication with the processor, and instructions stored in the memory. The instructions are executable by a processor to receive information related to commercial activities at at least one of a plurality of locations, the information being collected at the at least one of the plurality of locations, transmit the collected information for at least one of the plurality of locations to a display device, and generate a notice when the collected information indicates a threshold condition is met for at least one of the commercial activities.

In one embodiment, the instructions are executable to display at least some of the collected information on a display device at each of the plurality of locations. The display device may be located at a location remote from at least some of the plurality of locations. The instructions may be executable to transmit instructions for further commercial activities in response to the information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
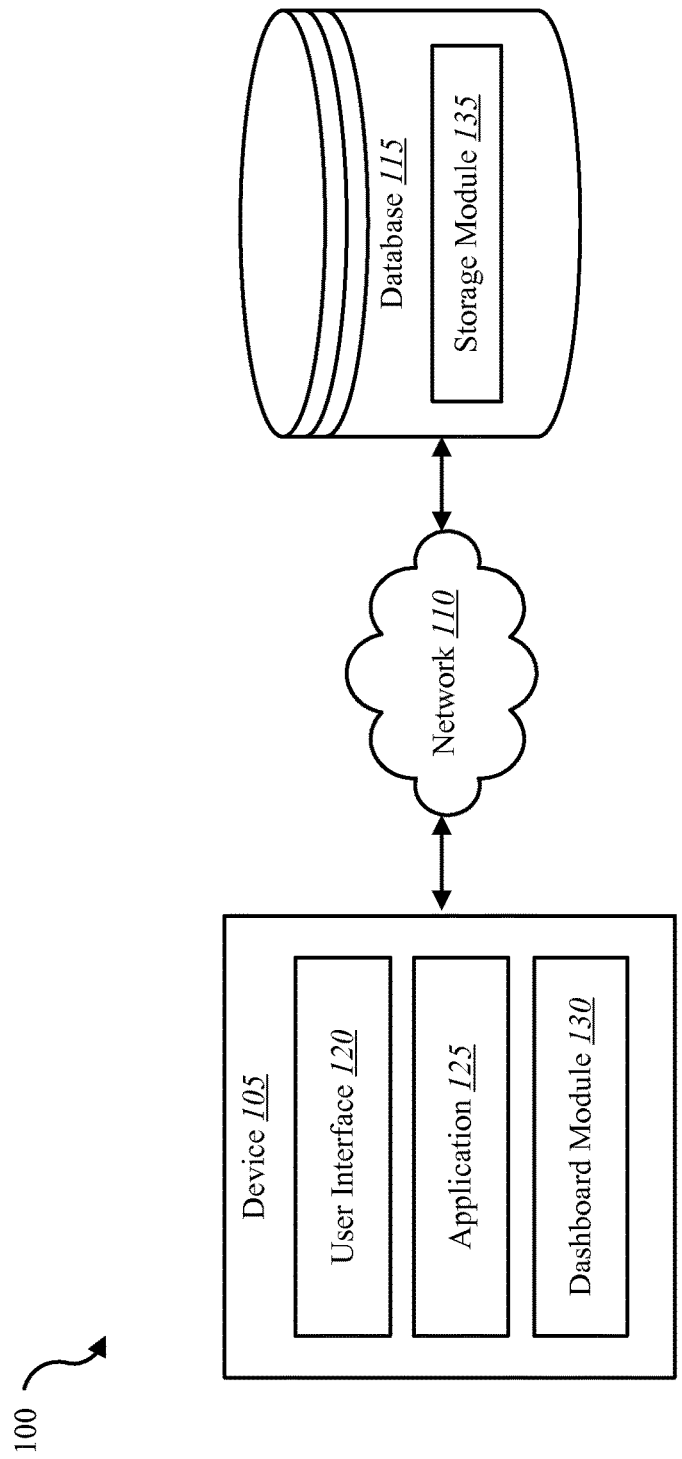
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to monitoring commercial activity. More specifically, the systems and methods described herein relate to collecting information about commercial activities at at least one commercial location, and displaying that collected information on an information panel (e.g., dashboard). The information may be collected for a plurality of commercial locations, and the dashboard may display at least some collected information for each of the commercial locations. The dashboard may be located remote from all of the commercial locations. In other embodiments, the dashboard may be located at one of the commercial locations. In yet further embodiments, multiple dashboards may be used to show various combinations of the information at local and/or remote locations. Some embodiments of the systems and methods described herein relate to multi-site dashboards in relation to an integration of, for example, home or business and/or security.

In one example, a user may desire to receive an alert in association with monitoring certain activities associated with a place of business. For example, a manager of a manufacturing plant may want to know when an anomaly in production is detected. Presently, the manager may manually check production to detect anomalies. The present systems and methods provide the means for monitoring one or more aspects of a place of business and informing a user associated with the place of business of current conditions and anomalies associated with the monitored activities. The types of activities and other information associated with a commercial place of business which can be monitored, stored, analyzed and displayed (e.g., on a dashboard) are limitless. Some examples, in addition to production at a manufacturing plant as mentioned above, may include consumer traffic, product inventory, product conditions, duration of tasks, number of transactions, and number of employees. The place of business may have many different forms including a commercial building, a home, or an outdoor setting.

Moreover, the systems and methods described herein may provide multiple dashboards at multiple sites to receive and display notifications in relation to the monitored aspects of the business. Furthermore, the systems and methods described herein may provide multi-site dashboards and notifications in relation to activities at any one of a plurality of places of business. At least one of the dashboards may be carried on a mobile handheld device. At least one of the dashboards may be integrated into another device or operate using aspects of an existing device such as a desktop computer and associated monitor.

The information collected about the activities may be processes, analyzed, and stored locally at the place of business. In other examples, at least some of the processing, analyzing, and storing functions may be carried out remotely from the place of business. The information may be transmitted, in any desired format, to a remote location for carrying out such functions. For example, the information may be stored in a remotely located database which is accessible by local and remote dashboards. In another example, the processing and analysis of information may be performed by a remote dashboard and/or the device that carries and/or displays the remote dashboard.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, a network 110, and a database 115. The device 105 includes a user interface 120, an application 125, and a dashboard module 130. The network 110 allows the device 105 and the database 115 to communicate with one another. Examples of device 105 include control panels, indicator panels, multi-site dashboards, mobile devices, smart phones, personal computing devices, computers, servers, etc.

In some embodiments, device 105 may be integrated with one or more home automation controllers (e.g., handheld and/or wall-mounted controllers) to both control aspects of a home and/or business as well as to receive and display notifications regarding monitored activity of a commercial entity (i.e., multi-site dashboard). Device 105 may be physically located at the premises that is being monitored and/or where the commercial activities take place. In some arrangements, device 105, or a portion thereof, is located remotely from the premises that is being monitored and/or where the commercial activities take place.

Although the components of device 105 are depicted as being internal to device 105, it is understood that one or more of the components may be external to the device 105 and connect to device 105 through wired and/or wireless connections. For example, one or more components (e.g., software, firmware, and/or hardware) of dashboard module 130 may be located, installed, and/or part of a automation controller or computing device.

Some examples of network 110 include cloud networks, local area networks (LAN), wide area networks (WAN), virtual private networks (VPN), wireless networks (using 802.11, for example), and/or cellular networks (using 3G and/or LTE, for example), etc. In some configurations, the network 110 may include the internet.

It is noted that in some embodiments, device 105 may not include a dashboard module 130. For example, device 105 may include application 125 that allows device 105 to perform at least some operations of dashboard module 130 in the event dashboard module 130 is located on another device or at another location. In some embodiments, device 105 may include a dashboard module 130 where at least a portion of the functions of dashboard module 130 are performed separately, sequentially, and/or concurrently on device 105. Likewise, in some embodiments, a user may access the functions of device 105 (directly or through device 105 via dashboard module 130) from a separate computing device.

Database 115 may include a storage module 135 that operates to store information associated with the monitored activities of a commercial entity and/or place of business. The information stored in database 115 may be accessible by device 105 and/or other devices over network 110. Database 115 may be located locally or remotely relative to device 105. In one example, device 105 may be coupled directly to database 115, and database 115 may be internal or external to device 105.

Dashboard module 130 may provide a visual display of the status of at least one commercial activity or metric from at least one business or commercial location. The visual display may show the status of a plurality of commercial activities for a single business location, and may display the status of at least one commercial activity for each of a plurality of business locations. In addition to or as an alternative to the visual display, dashboard module 130 may provide notifications related to the status of at least one commercial activity from at least one business location in the form of, for example, an audio or other physical signal (e.g., vibration).

Dashboard module 130 may collect information related to the commercial activity, or may receive information related to the commercial activity from one or more sources. For example, dashboard module 130 may be connected to at least one sensor, monitor, input device, camera, counter, or trigger device that assists in collecting the desired information about the commercial activity. The information may be automatically supplied to dashboard module 130, or dashboard module 130 may automatically collect the desired information. The collected information may be processed and/or analyzed using dashboard module 130. Alternatively, the collected information may be processed and/or analyzed using a processor, computer or other device that operates separately from dashboard module 130 and may be located locally or remotely from dashboard module 130.

The types of commercial activities and metrics collected by or transmitted to dashboard module 130 may include, for example as mentioned above, production at a manufacturing plant, consumer traffic, product inventory, product conditions, duration of tasks, number of transactions, and number of employees. Other commercial activities and metrics associated with a commercial location may include, for example, sales related metrics, business opening and closing times, vendor costs and performance, cost of utilities, incidence of injury, equipment operation and replacement costs, quality metrics, and customer satisfaction metrics. Many other commercial activities and/or metrics may be monitored, measured, collected, processed and/or analyzed in accordance with dashboard module 130 and environment 100 generally.

Dashboard module 130 may allow a user to control (either directly or via automated controls) an aspect of the place of business and/or the activities conducted at the place of business. Additionally, dashboard module 130 may allow a user to control other aspects related to environment 100 including, for example, security, locking or unlocking a door, checking the status of a door, locating a person or item, controlling lighting, thermostat, cameras, receiving notification regarding a current status or anomaly associated with a home, office, place of business, and the like. In some configurations, application 125 may enable device 105 to interface with a home automation controller (not shown) to provide home automation content to device 105. Thus, application 125, separately or via the dashboard module 130, may allow users to control other aspects of the place of business besides the monitored commercial activities. Further details regarding the dashboard module 130 are discussed below with reference to FIG. 4.

Figure 2:
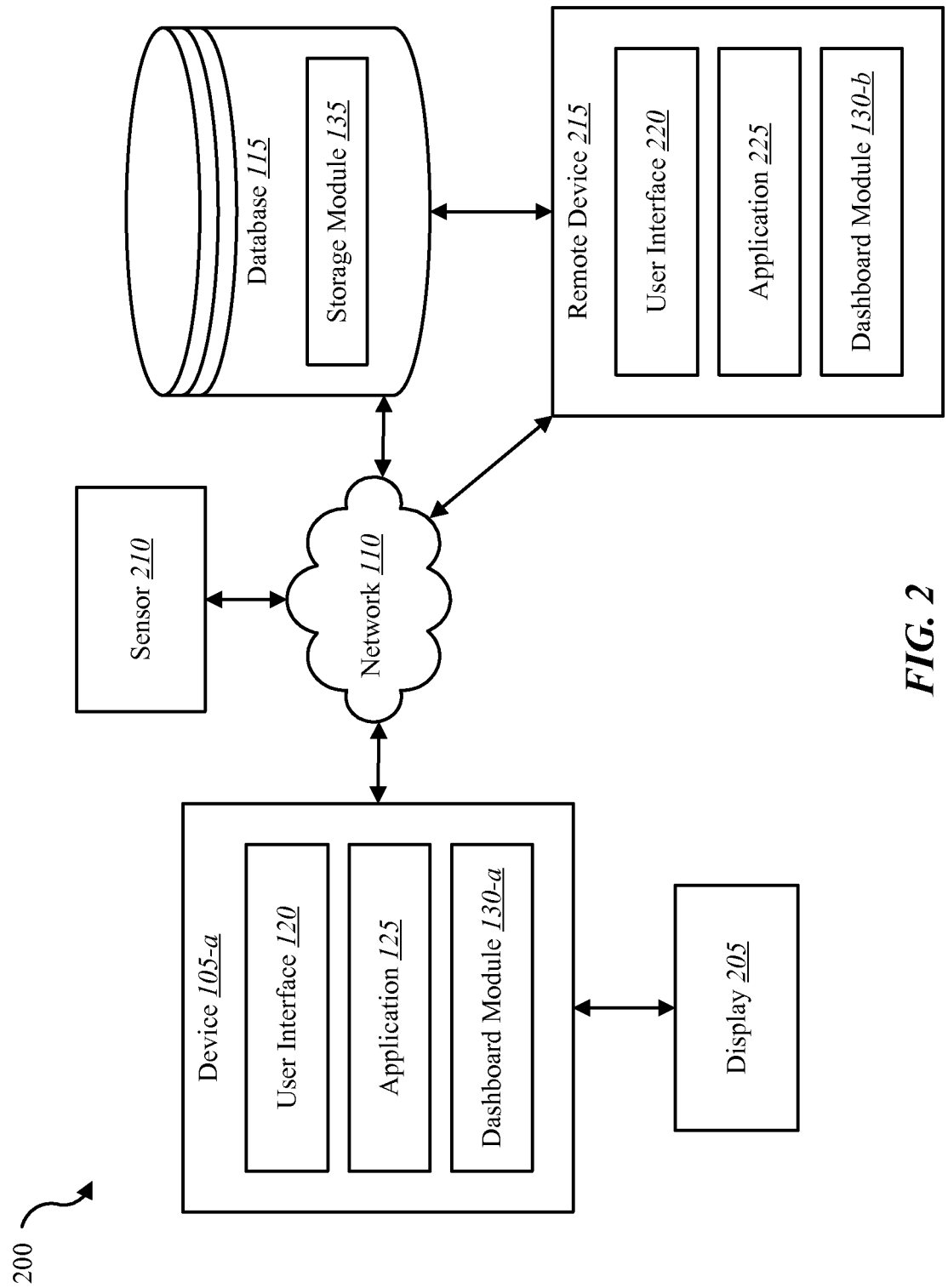
FIG. 2 is a block diagram illustrating another embodiment of an environment in which the present systems and methods may be implemented.

FIG. 2 is a block diagram illustrating another embodiment of an environment 200 in which the present systems and methods may be implemented. FIG. 2 may illustrate an example multi-site dashboard, or a multi-dashboard environment. Environment 200 may be configured to improve access to information related to commercial activities at at least one place of business. The environment 100 may include a device 105-a, a network 110, a database 115, a display 205, a sensor 210, and a remote device 215. Device 105-a may be one example of dashboard module 130-a depicted in FIG. 1. As depicted, device 105-a may include a user interface 120, an application 125, and a dashboard module 130. The network 110 allows the device 105, the database 115, the sensor 210, and the remote device 215 to communicate with one another.

Examples of device 105-a include control panels, indicator panels, multi-site dashboards, mobile devices, smart phones, personal computing devices, computers, servers, etc. Device 105-a may include a display or other device for displaying or communicating information to a user. Display 205 may provide display or communication capabilities in place of or in addition to the display and/or communication aspects of device 105-a. Display 205 may be located at a property or premises where device 105-a, or at least some components of device 105-a are located. Display 205 may also be used to input information related to commercial activities at at least one business location. Display 205 may include a touch screen or other feature for manual input of information by a user.

Sensor 210 may be connected in electronic communication with device 105-a and/or dashboard module 130-a via network 110. Examples of sensor 210 include a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

Sensor 210 may represent one or more separate sensors or a combination of two or more sensors in a single device. For example, sensor 210 may represent one or more camera sensors and one or more motion sensors connected to environment 200. Additionally, or alternatively, sensor 210 may represent a combination sensor such as both a camera sensor and a motion sensor integrated in the same device. Sensor 210 may be integrated with a user recognition system. For example, sensor 210 may perform or connect to a device that performs facial recognition, voice recognition, gait recognition, and other computer-recognizable patterns by performing one or more recognition algorithms that identify an object, a user, etc. Although sensor 210 is depicted as connecting to device 105-a over network 110, in some embodiments, sensor 210 may connect directly to device 105-a. Additionally, or alternatively, sensor 210 may be integrated with a home appliance or fixture such as a light bulb fixture. Sensor 210 may include an accelerometer to enable sensor 210 to detect a movement. Sensor 210 may include a wireless communication device enabling sensor 210 to send and receive data and/or information to and from one or more devices in environment 200. Additionally, or alternatively, sensor 210 may include a GPS sensor to enable sensor 210 to track a location of sensor 210. Sensor 210 may include a proximity sensor to enable sensor to detect proximity of a person relative to a predetermined distance from a dwelling (e.g., geo-fencing).

Remote device 215 may communicate with device 105-a and sensor 210 via network 110. Additionally, or alternatively, remote device 215 may communication with device 105-a via database 115. Additionally, or alternatively, remote device 215 may communicate with database 115 via network 110. Remote device 215 may include a user interface 220, application 225, and dashboard module 130-b. Remote device 215 may have at least some of the same components and capabilities as device 105-a. For example, dashboard module 130-b may include similar functionality as dashboard module 130-a.

Remote device 215 may receive information about commercial activities from at least one place of business. Remote device 215 may display at least some of the information and may provide notifications to a user related to the information at a location that is remote from the at least one place of business. While device 105-a may be located on-site at the place of business where at least some of the information is collected, remote device 215 may be located at another location which is at least separate from and remote from device 105-a and typically remote from the place of business to which the information relates. In some arrangements, remote device 215 may be located at one of the locations for which information is displayed on remote device 215.

User interface 220 may provide a way for a user to interact with features and functionality of remote device 215. Application 225 may allow device 105 to perform at least some operations of dashboard module 130-b. In some configurations, application 225 may enable device 215 to interface with a home automation controller (not shown) to provide home automation content to remote device 215 and/or device 105-a. Thus, application 225, separately or via the dashboard module 130-b, may allow users to control other aspects of the place of business besides the monitored commercial activities.

Information related to commercial activities associated with at least one place of business (e.g., information collected by sensor 210 and/or transmitted/collected by device 105-a) may be stored in database 115. For example, at least some of the collected data, whether in the form of raw data or data that has been processed or analyzed in some way, may be stored in storage module 135 of database 115. Remote device 215 may access any of the information stored in database 115 for any of a plurality of places of business. In at least some examples, remote device 215 may obtain information from only database 115 rather than directly from any of devices 105-a or sensors 210 associated with any of a plurality of places of business.

Figure 3:
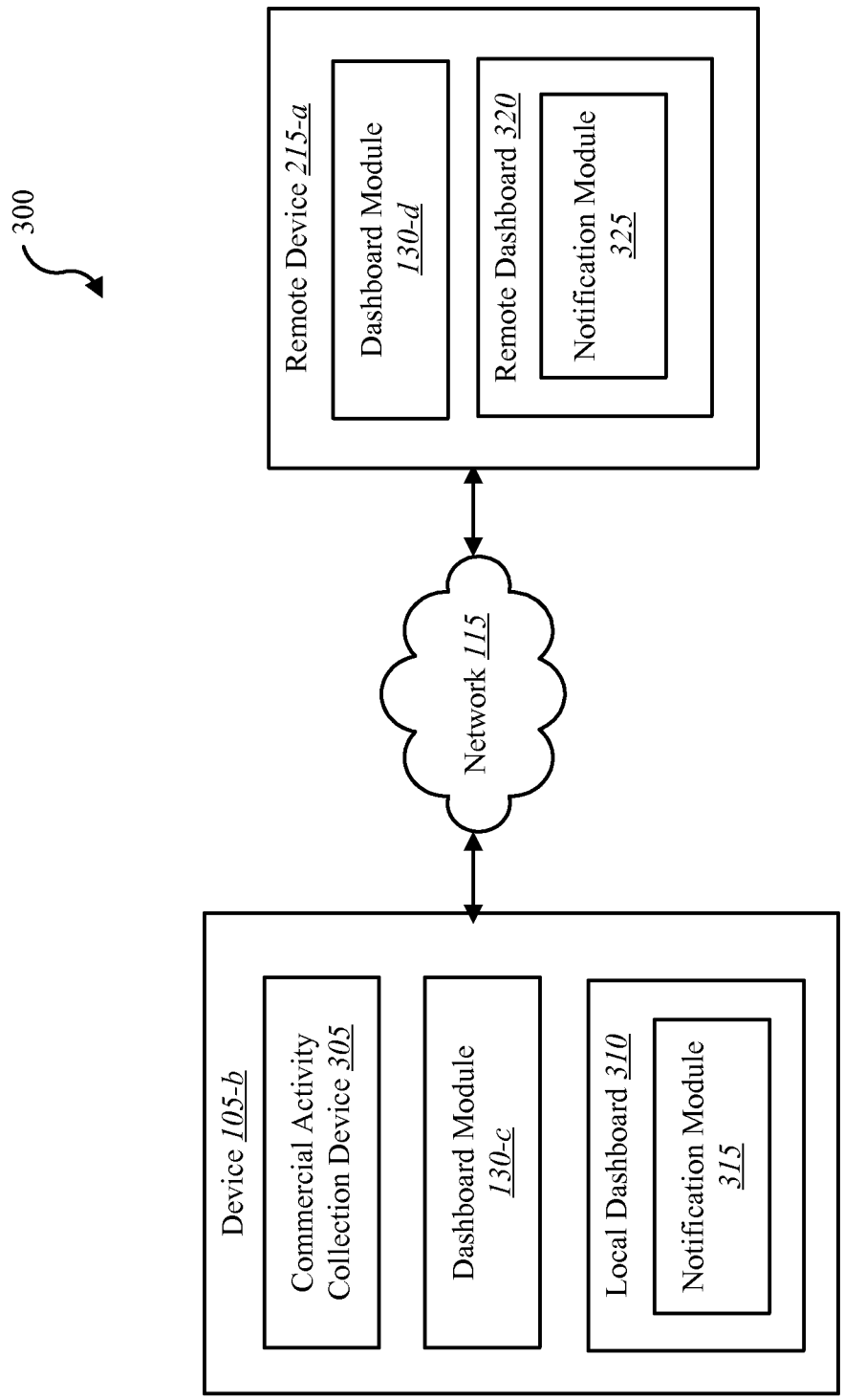
FIG. 3 is a block diagram illustrating another embodiment of an environment in which the present systems and methods may be implemented.

FIG. 3 is a block diagram illustrating one example of an environment 300 for multi-site dashboards configured to improve access to information related to commercial activities. As depicted, environment 300 may include an on-site location associated with device 105-c and an off-site location associated with remote device 215-a. Device 105-c and remote device 215-a communicate via a network 115. Device 105-c may include a commercial activity collection device 305, a dashboard module 130-c, and a local dashboard 310 having a notification module 315. Remote device 215-a may include a dashboard module 130-d and a remote dashboard 320 having a notification module 325. Local dashboard 310 and remote dashboard 320 may be configured to display notifications from notification modules 315, 325, respectively, in connection with monitored commercial activities at an on-site location wherein device 105-c, or at least components thereof, reside. Dashboard modules 130-c and 130-d may be examples of dashboard module 130 of FIGS. 1 and/or 2.

In one embodiment, commercial activity monitoring sensor 305 may monitor one or more on-site commercial activities associated with one or more places of business. Although a single sensor 315 is shown, it is understood that any one of the places of business may include one or more sensors. Dashboard module 130-c may compare monitored activities to one or more established settings and/or thresholds. Upon detecting an activity that satisfies an established threshold (e.g., a current status and/or anomaly related to a monitored business related activity), dashboard module 130-c may generate a notification via notification module 315. Dashboard module 130-c may show the notification on one or more displays associated with device 105-c at one of the places of business (e.g., an location where device 105-c resides), an off-site location (e.g., where remote device 215-a or portions thereof reside), and/or a device at a third location (e.g., a mobile computing device located at a third location apart from or in close proximity to both device 105-c and remote device 215-a).

In one embodiment, local dashboard 310 may be located at a place of business where commercial activities are performed. Examples of places of business may include, for example, an automated place of business (e.g., automated vending machine, etc.), manufacturing plant, company office space, distribution plant, shipping company, restaurant, bakery, grocery store, clothing store, print shop, dry cleaners, automobile dealership, amusement park, kiosk, sports venue, mobile business vehicle or cart, and the like. Remote dashboard 320 may be located at a location different than the place of business where the local dashboard 310 is located. In some embodiments, remote dashboard 320 may be located in another area of the place of business. For example, local dashboard 310 may be located in a first room, floor, and/or building at a place of business and remote dashboard 320 may be located in a second room, floor, and/or building at the same place of business. Alternatively, local dashboard 310 may be located at a place of business and off-site dashboard may be at a location apart from the place of business such as at an office or a residence on a different street, address, city, etc.

In one example, commercial activity collection device 305 may detect an activity that satisfies a certain threshold. Upon identifying the anomaly, dashboard module 130-c may show a notification containing information regarding the anomaly on remote dashboard 320. Additionally, or alternatively, dashboard module 130-c may show the notification on local dashboard 310. In some embodiments, dashboard module 130-c may detect that a person is performing a certain task at a first location. Upon detecting the task being performed, dashboard module 130-c may show the notification on one or both of local dashboard 310 and remote dashboard 320. Thus, commercial activities being monitored at one location may be relayed in real-time to one or more people at one or more other locations in order to notify and keep these people aware of the monitored commercial activities, enabling the same people to be able to react to the information in a timely manner and avoid costly mistakes that may lead to, for example, loss of revenue, customer dissatisfaction, and the like.

Figure 4:
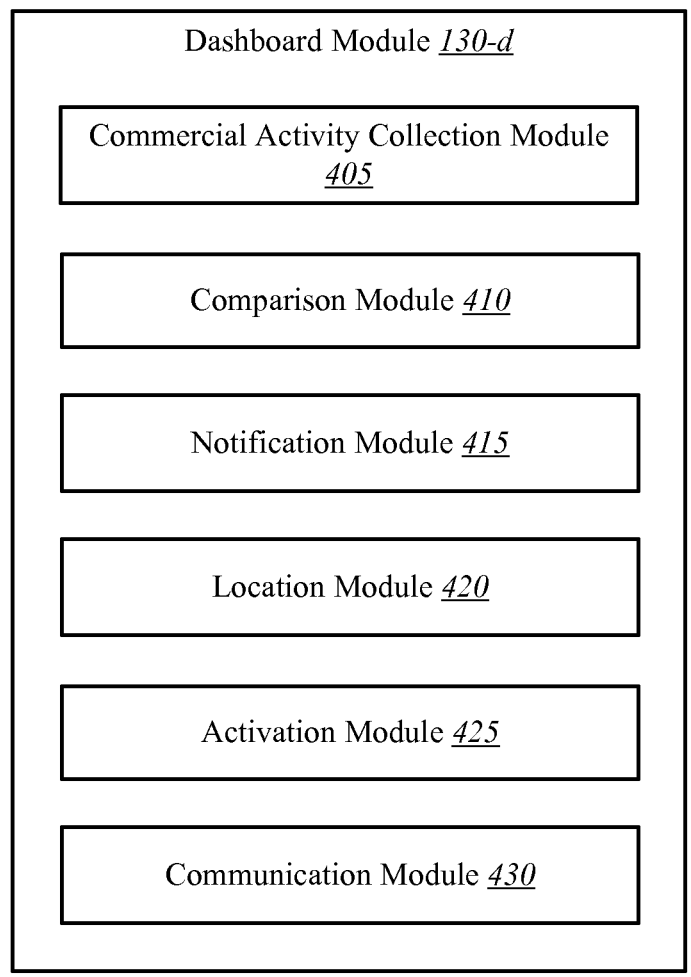
FIG. 4 is a block diagram illustrating an example dashboard module in accordance with the present systems and methods.

FIG. 4 is a block diagram illustrating one example of a dashboard module 130-d. Dashboard module 130-c may be one example of dashboard module 130 depicted in FIG. 1. As depicted, dashboard module 130-d may include commercial activity collection module 405, comparison module 410, notification module 415, location module 420, activation module 425, and communication module 430.

Commercial activity collection module 405 may be configured to monitor, via, for example, a sensor at a first location associated with a commercial entity, an activity, condition, or status of the commercial entity and/or the operation of some aspect of the commercial entity. For example, commercial activity collection module 405 may monitor a status of an asset, product, service, vehicle, customer, employee, and any other aspect related to a commercial activity of a commercial entity and/or place of business. Commercial activity collection module 405 may monitor a status of a commercial activity in conjunction with a sensor or other information collection device. In some embodiments, commercial activity collection module 405 may capture an image of a customer, employee, product, or activity at the place of business. Commercial activity collection module 405 may identify the customer by performing a customer recognition algorithm in relation to the image of the customer (e.g., facial recognition algorithm, voice recognition, gait recognition, object recognition, and the like).

In some cases, commercial activity collection module 405 may monitor and/or track a time of arrival, a time of departure, current location, efficiency rating (e.g., number of products produced, number of tasks completed, number of customers served, etc.), and other similar aspects of an employee, consumer, guest or machine associated with the commercial entity. Upon determining one or more aspects of the monitored activity satisfy a predetermined threshold, dashboard module 130-d may generate a notification and/or transmit information to one or more locations, systems or devices (e.g., the database 115). In some embodiments, commercial activity collection module 405 may track an aspect of a product or service associated with the commercial entity. The monitored aspect of the product or service may include at least one of a number of customers served, a location of a customer, a customer satisfaction, a number of sales made, a number of contacts made, a number of products produced, a number of products served, a number of products received, a number of products delivered, a location of a product, revenue generated, and other similar aspects of products or services of a place of business.

In one example, a sensor (e.g., sensor 210 depicted in FIG. 2) may detect a customer leaving from or arriving at a predefined area (e.g., a place of business). Upon detecting the customer arriving, commercial activity collection module 405 may track the customer and/or one or more activities of the customer. In one example, commercial activity collection module 405 may count a number of customers at the place of business. Upon determining the detected number of customers satisfies a threshold, commercial activity collection module 405 may be triggered to perform an action such as generating a notification. For example, a monitored number of customers may be below a predefined threshold of customers, which may indicate a problem of which employees at the place of business may not be aware. By generating a notification and sending the notification to, for example, a person at the location of the place of business or a person associated with the place of business who is located remote from the place of business, this person may determine whether a problem exists and react to a potential problem in a timely manner, thus minimizing the potential problem.

In one embodiment, comparison module 410 may compare the monitored aspect of the place of business to a setting or threshold to determine whether a deviation exists between the monitored aspect of the place of business and a setting of the policy. Notification module 415 may send a notification to an occupant based on the determined deviation of the monitored aspect of the place of business. In one embodiment, notification module 415 may generate a notification in response to the monitoring of one or more aspects of the place of business and/or a detected anomaly associated with the one or more aspects of the place of business. In one example, dashboard module 130-d may generate a notification and/or play a sound to alert a user in relation to a certain commercial activity. Additionally, or alternatively, dashboard module 130-d may detect anomalies in the commercial activities of a place of business, determine a cause of the anomalies, and provide notification regarding the detected anomalies.

In one embodiment, upon determining a value derived from the monitored activity satisfies a predetermined threshold of a policy, notification module may generate a notification. The notification may include information related to the value derived from the activity monitored at a first location (e.g., place of business). In one embodiment, in conjunction with notification module 415, dashboard module 130-d may display the information related to the value derived from the monitored activity, an off-site indicator panel located at a second location. In one example, an automated place of business may provide a product and/or service to a customer without the presence of an employee (e.g., vending machine, automatic teller machine, automatic movie rental machine, etc.). Thus, a user located remote from the place of business may be automatically alerted in real time to a potential problem without the person having to routinely inspect the place of business in person.

In some cases, the second location may be different from the first location, or place of business. For example, the second location may be on one floor of a building and the first location may be on a different floor of the same building. In one case, the first location may be at a first building of a building complex and the second location may be at a second building of the same building complex. Alternatively, the second location may be at a relatively distant geographic area from the first location such as on a different street, at a different address, a different city, etc. In one embodiment, in conjunction with notification module 415, dashboard module 130-d may display the information related to the value derived from the monitored activity on an on-site indicator panel (e.g., local dashboard 310 described with reference to FIG. 3) located at the first location, or place of business.

In one embodiment, location module 420 may determine a location of a user associated with the commercial entity. For example, dashboard module 130-d may determine that a particular user is to receive a notification related to a monitored activity of the place of business. In order to ensure that this user receives the notification, location module 420 may determine the user's location. For example, upon determining the user is not located at the second location, and thus away from the off-site indicator panel, notification module 415 may send an alternative notification in the form of an electronic message addressed to the user. This electronic message may include a version of the same information sent to the off-site indicator panel. In one embodiment, additionally or alternatively, upon determining a user associated with the commercial entity is watching subscription programming on a display, notification module 415 may display the notification on the display. In some cases, notification module 415 may display a live feed view of the first location on the display in conjunction with the notification. For example, notification module 415 may include a user-selectable link with the notification, the notification informing the user that clicking on the link activates a live feed view of the place of business (e.g., live video and/or live images). In some embodiments, upon determining a display is deactivated, activation module 425 may activate the display. For example, upon determining a particular user is located at the second location, but that a display (e.g., television, computer monitor, etc.) at the second location is deactivated, activation module 425 may activate the display. Upon determining the display is activated, notification module 415 may display the notification on the activated display.

Additionally, or alternatively, location module 420 may determine a location related to, for example, products, customer, or other aspects pertaining to a given place of business or commercial activity. Location module 420 may include a GPS device and may be used to determine a location of dashboard module 130d and or device 105, dashboards 310, 320, or other components or aspects of any of the environments disclosed herein.

In some embodiments, notification module 415, in conjunction with the user interface 120, may display a notification on a display connected to a set top box. Notification module 415 may display the notification in relation to a presently viewed channel of the subscriber program content. In some cases, notification module 415 may display the notification in at least a portion of a viewing area of the channel. For example, a user watching content from a satellite DVR on a television may receive a notification displayed on at least a portion of the screen of the television.

In some embodiments, notification module 415 may adapt a notification based on certain conditions. Notification module 415 may determine whether to display a notification on a display based on notification rules (e.g., type of program currently being viewed, type of activity detected, etc.) associated with a current state of device 105. For example, notification module 415 may determine whether to display the notification the content provided by a set top box that a user is currently viewing. For instance, based on the notification rules, if the type of activity detected is determined to be a minor notification and if a user is watching sports (e.g., boxing match, baseball, football, etc.), notification module 415 may alter the type of notification (e.g., scrolling message instead of picture-in-picture), block the message from being displayed on the television, and/or route the notification to another device, such as an email or a text message sent to a smartphone or tablet device. In some cases, notification module 415 may alter the notification based on the current state of the device 105. For another type of programming, notification module 415 may play a sound (e.g., a tone, a combination of tones, a recorded voice notification, a text to speech notification, and the like) based on the type of notification. In some embodiments, notification module 415 may alter the destination of the notification based on the type of notification and/or the type of programming currently being viewed by the user. For example, if the notification rules require minimum notification for a certain type of programming, the notification module 415 may display in alternative modes of communication and/or using various forms and structures for dashboards. For instance, notification module 415 may email or text message a notification to a user based on the type of notification, the type of programming the user is currently watching, whether programming is currently being watched, and/or the current location of the user, etc.

Communication module 430 of dashboard module 130-d may provide communication of notices from module 415 and other types of communications locally and remotely. Communication module 430 may implement different technologies to communicate notifications, alters, updates, information, etc. to local and remote dashboards and various other devices.

Figure 5:
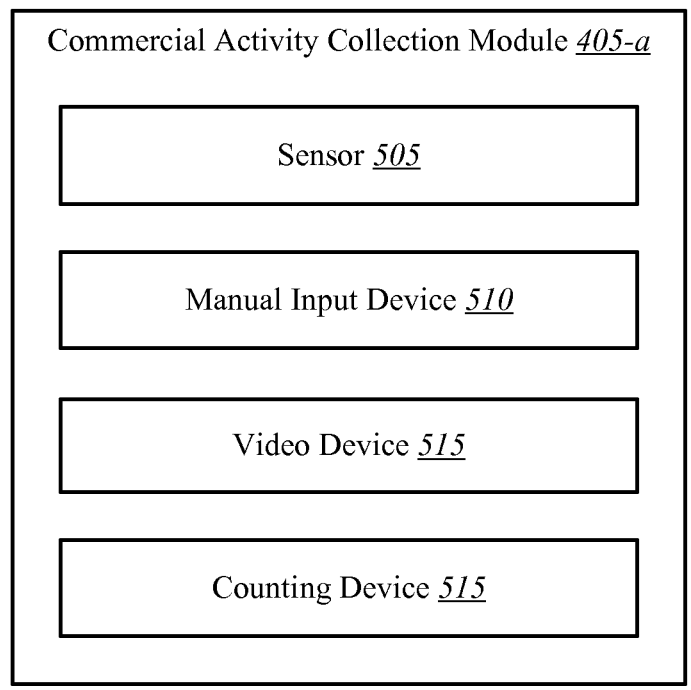
FIG. 5 is a block diagram illustrating an example commercial activity collection module in accordance with the present systems and methods.

FIG. 5 is a block diagram illustrating one example of a commercial activity collection module 405-a. Commercial activity collection module 405-a may be one example of commercial activity collection module 405 depicted in FIG. 4. As depicted, commercial activity collection module 405-a may include any one of a plurality of information collecting components including, for example, sensor 505, manual input device 510, video device 515, and counting device 515. The information collecting components of commercial activity collection module 405-a may provide a single or multiple ways in which information may be collected, automatically or manually, regarding at least one commercial activity related to a place of business. Sensor 505 may be one example of sensor 210 depicted in FIG. 2. Manual input device 510 may include, for example, a data entry device (e.g., keyboard), a touch screen, or the like. Video device 515 may record and/or monitor, for example, operation of equipment, movement or numbers of employees and customers, and any of a number of aspects related to one or more commercial activities. Counting device 515 may provide manual or automatic counting of various aspects of a commercial activity or metric.

Figure 6:
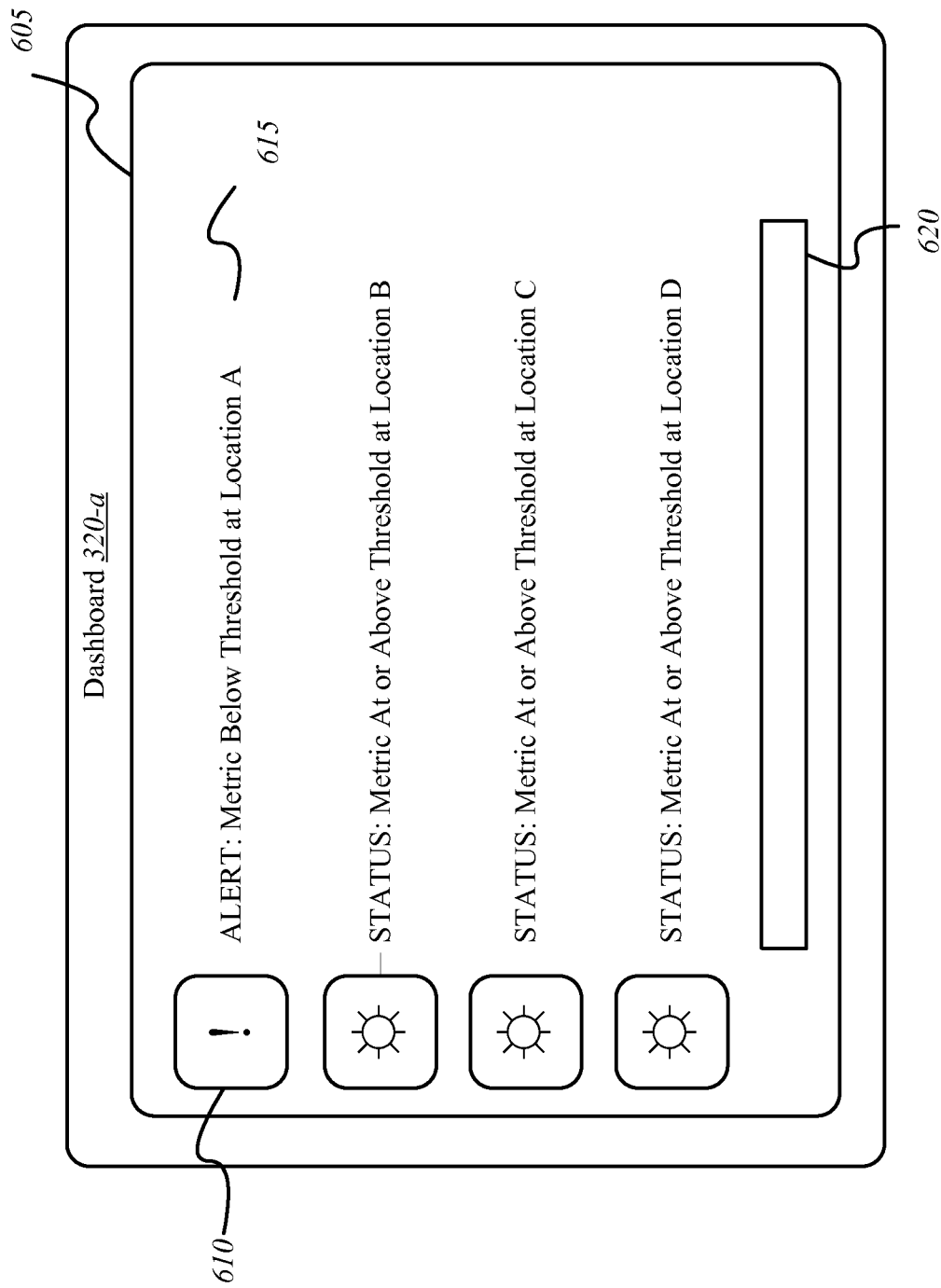
FIG. 6 is a block diagram illustrating an example multi-site dashboard displaying information in accordance with the present systems and methods.

FIG. 6 is a block diagram illustrating one example of a dashboard 320-a displaying information related to the monitoring of at least one commercial activity. As depicted, the dashboard 320-a (i.e., indicator panel) may include a display 605. Dashboard 320-a may be one example of device 105, dashboard module 130, and/or dashboards 310, 320 of FIGS. 1, 2, 3 and/or 4. In one embodiment, dashboard module 130 posts a visual notification 610 on display 605. Visual notification 610 may include a symbol that represents a status of one or more commercial activity or metric associated with at least one place of business. A plurality of visual notifications 610 may be shown on display 605. Each visual notification 610 may represent a certain commercial activity or metric associated with one or more location (e.g., place of business). Alternatively, each visual notification 610 may represent a different commercial activity or metric for a single location. The visual notification 610 may be displayed on an area of the display 605 that is active for receiving a touch input. For example, the visual notification 610 may be touched by a user and a responsive action may automatically occur. One or more pre-programmed actions (e.g., a notification, order, or the like) may occur upon selecting visual notification 610. Other portions of display 605 may include touch activation features. Additionally, or alternatively, a data entry field 620 may be present on display 605 for entry by the user of instructions, notifications, or the like in response the visual notifications 610.

A description 615 may be associated with each visual notification 610. Description 615 may provide details, for example, about the commercial activity, the location of the activity, the threshold or trigger, the status, what action has already been taken, and other details associated the commercial activity.

Dashboard 320-*a* may include an audio speaker. Dashboard module 130 may play one or more audio tones on the audio speaker of dashboard 320-*a* to provide an auditory notification in conjunction with the visual notification 610 shown on display 605. The visual notification 610 may be shown on display 605 in conjunction with one or more home automation controls to allow a user to control media, lighting, temperature, for example.

Figure 7:
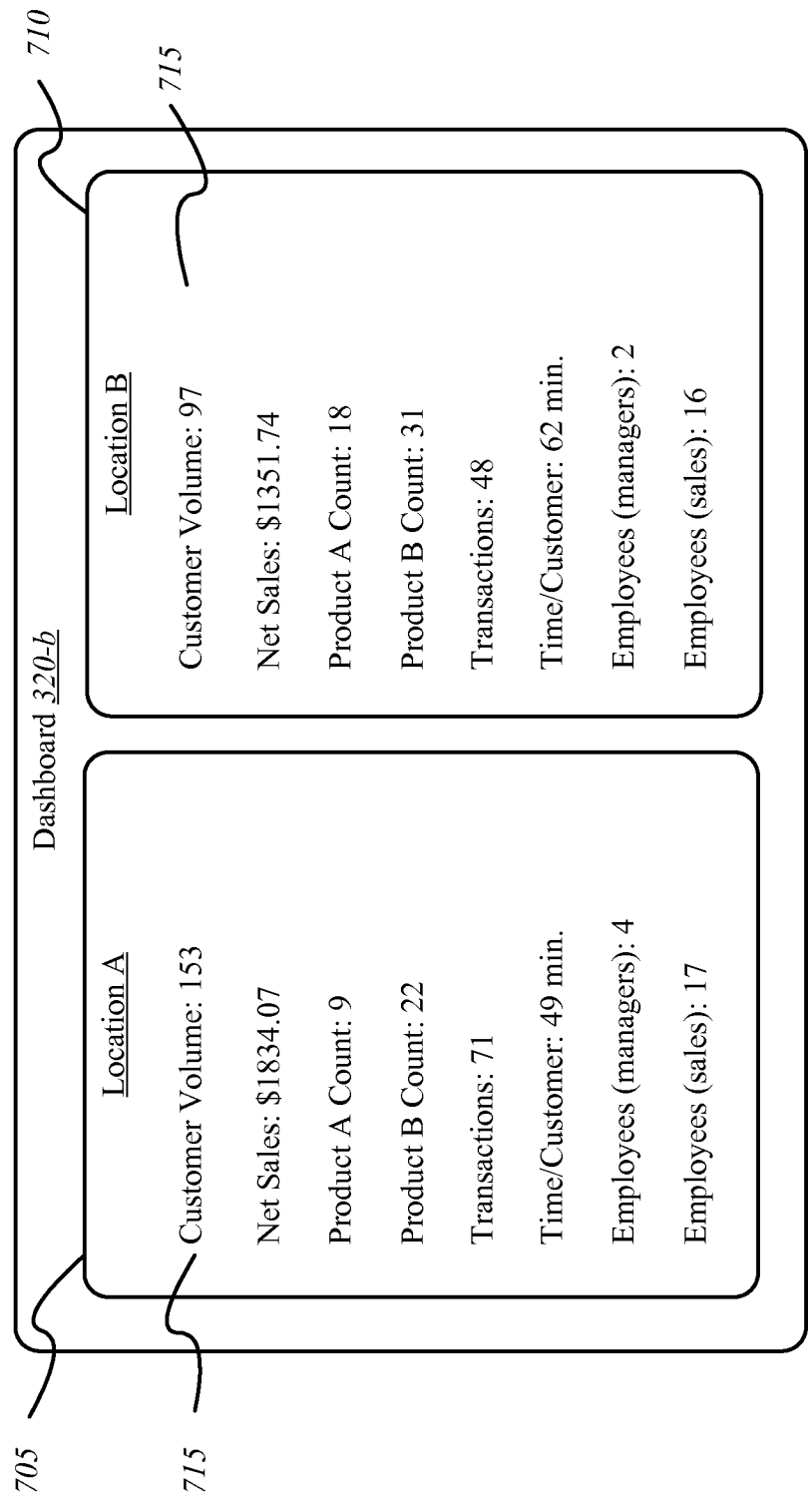
FIG. 7 is a block diagram illustrating another example multi-site dashboard displaying information in accordance with the present systems and methods.

FIG. 7 is a block diagram illustrating another example of a dashboard 320-*b* displaying information related to the monitoring of commercial activities. As depicted, the dashboard 320-*b* (i.e., indicator panel) may include first and second displays 705, 710. Dashboard 320-*b* may be one example of device 105, dashboard module 130, and/or dashboards 310, 320 of FIGS. 1, 2, 3 and/or 4. In one embodiment, dashboard module 130 posts at least one visual notification 715 on first display 705 associated with Location A, and at least one visual notification 715 on second display 710 associated with Location B. Each visual notification 715 may relate to at least one aspect of a commercial activity or metric associated with a given location. A plurality of visual notifications 715 may be listed in each of the first and second displays 705, 710. Each visual notification 715 may include various information such as, for example, a descriptor of the commercial activity as well as a quantitative value for the commercial activity (if applicable). Dashboard 320-*b* may include visual indicators associated with at least some of the visual notifications 715 that alert the user when the a trigger or threshold value is met or exceeded.

With the arrangement of dashboard 320-*b*, a user is able to observe the status or at least one indicator related to a plurality of commercial activities or metrics associated with a plurality of places of business. The user may perform a manual or visual comparison of certain of the visual notifications 715 for a plurality of locations.

Dashboard 320-*b* may include an audio speaker. Dashboard module 130 may play one or more audio tones on the audio speaker of dashboard 320-*b* to provide an auditory notification in conjunction with the visual notifications 715 shown on displays 705, 710. In one embodiment, dashboard 320-*b* may include a viewing device dedicated to showing a current status, monitored activity, and/or detected anomaly associated with activities of a commercial entity and/or place of business. Additionally, or alternatively, a data entry field may be available on at least one of displays 705, 710 for entry by the user of instructions, notifications, or the like in response the visual notification 715.

Figure 8:
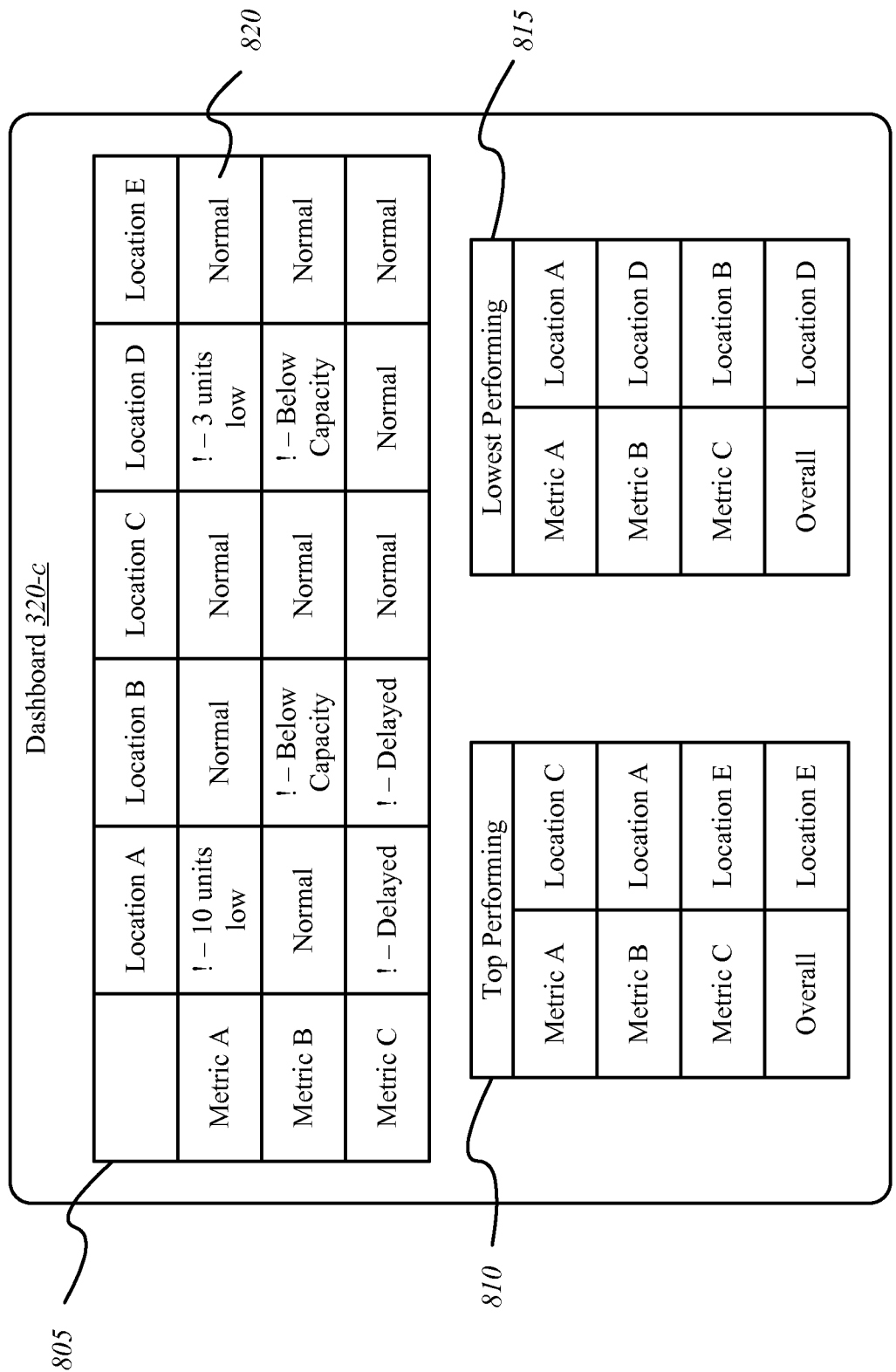
FIG. 8 is a block diagram illustrating another example multi-site dashboard displaying information in accordance with the present systems and methods.

FIG. 8 is a block diagram illustrating another example of a dashboard 320-*c* displaying information related to the monitoring of commercial activities. As depicted, the dashboard 320-*c* includes first, second and third displays 805, 810, 815. Displays 805, 810, 815 may each display different information, such as notifications 820 related to normal or abnormal levels for one or more commercial activities or metrics, and top or bottom performing locations for certain of the commercial activities or metrics.

Dashboard 320-*c* may include information about commercial activities for a plurality of locations (e.g., 1-20 locations). The information may be displayed, notifications related to at least some of the commercial activities may be displayed, and comparative data concerning information among a plurality of locations may be displayed. Portions of any one of displays 805, 810, 815 may include touch activation features, wherein touching a portion of the display creates an automatic response such as sending instructions or notice. Additionally, or alternatively, a data entry field may be present on any one of displays 805, 810, 815 for entry by the user of instructions, notifications, or the like in response visual notifications 820.

Additionally, or alternatively, a data entry field may be available on at least one of displays 805, 810, 815 for entry by the user of instructions, notifications, or the like in response the visual notification 820.

Figure 9:
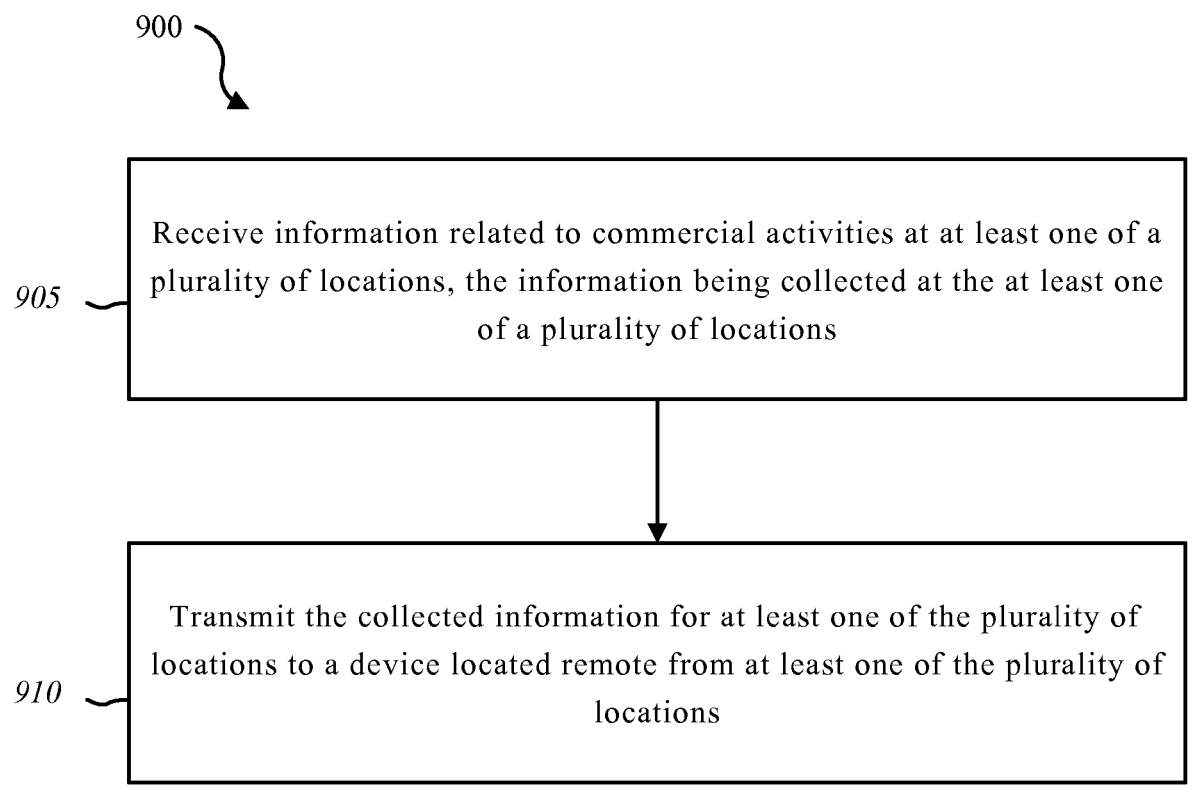
FIG. 9 is a flow diagram illustrating one embodiment of a method for monitoring at least one commercial activity.

FIG. 9 is a flow diagram illustrating one embodiment of a method 900 for monitoring at least one commercial activity. In some configurations, the method 900 may be implemented by the dashboard module 130 illustrated in FIGS. 1, 2, 3, 4 and/or 5. In some configurations, the method 900 may be implemented in conjunction with the devices 105 illustrated in FIGS. 1, 2 and/or 4.

Block 905 includes receiving information related to commercial activities at at least one of a plurality of locations, the information being collected at the at least one of a plurality of locations. Block 910 includes transmitting the collected information for at least one of the plurality of locations to a device located remote from at least one of the plurality of locations.

The method of FIG. 9 may also include transmitting instructions from to at least one of the plurality of locations in response to the displayed information, and transmitting the collected information for a select one of the plurality of locations to a local device located on site at the select one of the plurality of locations wherein the local device displays the collected information. The collected information may be stored in a database located remote from the plurality of locations. The collected information displayed on the device may be received from the database. The information may be collected via a manually entering of information about at least one commercial activity. The collected information about at least one commercial activity may be automatically detected. The commercial activity may include at least one of consumer traffic, product inventory, duration of tasks, number of transactions, and number of employees. The method may include comparing the collected information from one of the plurality of locations with collected information from at least one other of the plurality of locations, transmitting instructions to perform a separate commercial activity in response to the collected information indicating a threshold condition is met, and/or automatically generating instructions when the threshold condition is met.

Figure 10:
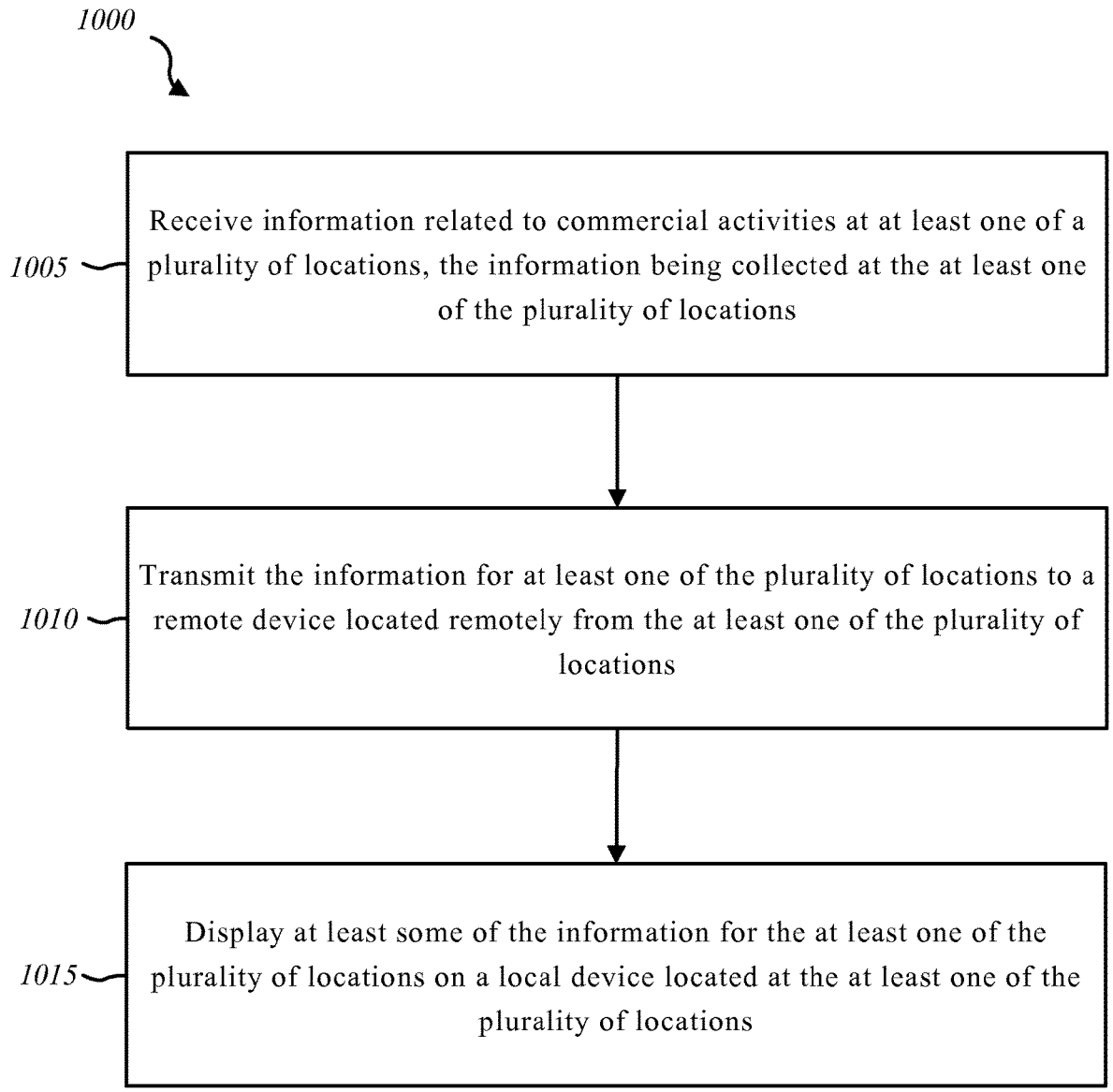
FIG. 10 is a flow diagram illustrating one embodiment of a method for monitoring commercial activities.

FIG. 10 is a flow diagram illustrating one embodiment of a method 1000 for updating one or more indicator panels according to monitored commercial activity. In some configurations, the method 1000 may be implemented by the dashboard module 130 illustrated in FIGS. 1, 2, 3, 4 and/or 5.

Block 1005 includes receiving information related to commercial activities at at least one of a plurality of locations, the information being collected at the at least one of the plurality of locations. Block 1010 includes transmitting the information for at least one of the plurality of locations to a remote device located remotely from the at least one of the plurality of locations. Block 1015 includes displaying at least some of the information for the at least one of the plurality of locations on a local device located at the at least one of the plurality of locations.

The information referenced in FIG. 10 may be received for a plurality of locations. The method of FIG. 10 may include displaying information from each of the plurality of locations on the local device. Displaying the collected information on the local device may include displaying collected information for only the location where the local device resides. The method of FIG. 10 may include transmitting instructions to perform a further commercial activity in response to the collected information.

Figure 11:
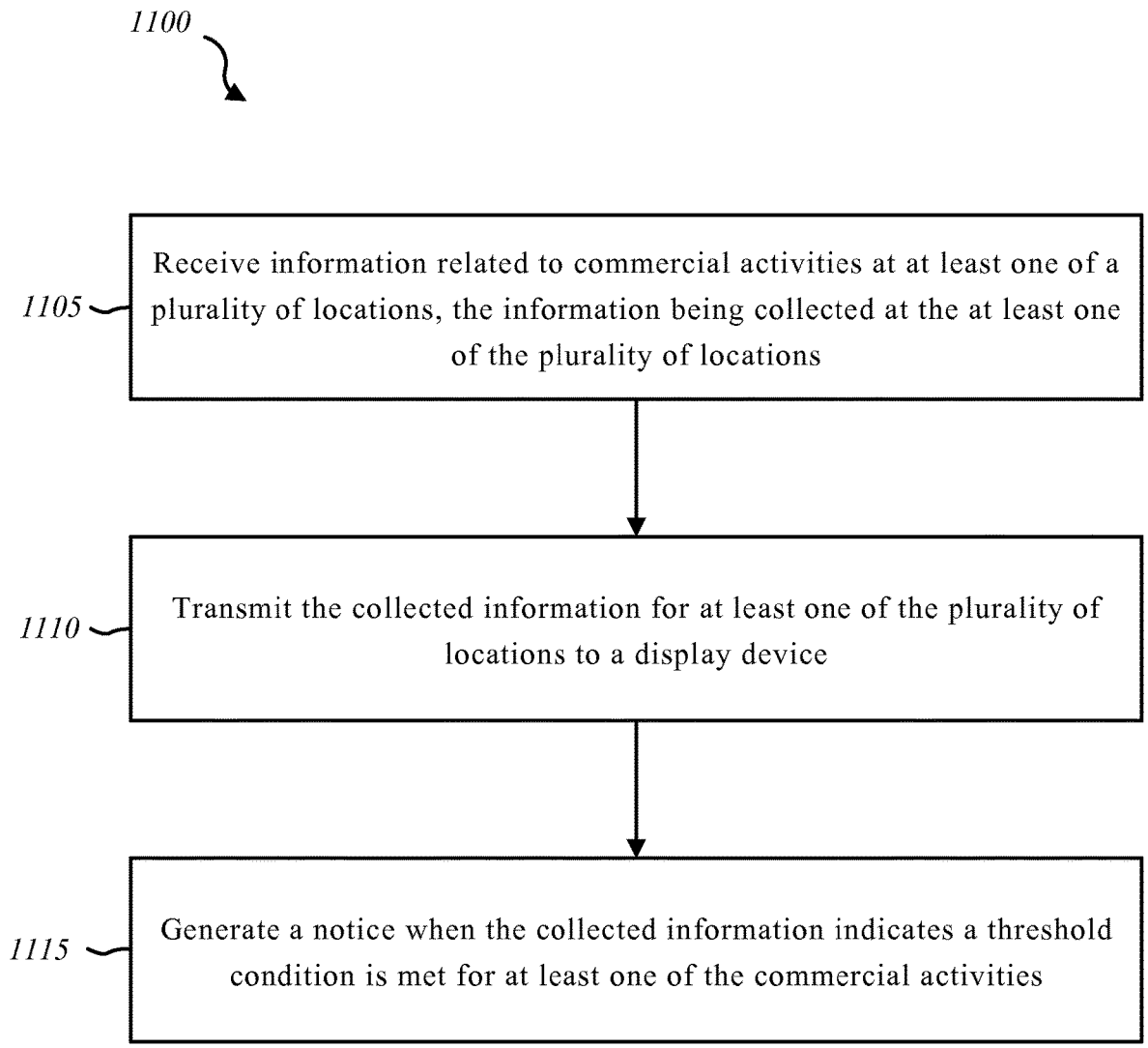
FIG. 11 is a flow diagram illustrating one embodiment of a method for monitoring at least one commercial activity.

FIG. 11 is a flow diagram illustrating one embodiment of a method 1100 for displaying a notification related to monitored activities of a commercial entity. In some configurations, the method 800 may be implemented by the dashboard module 130 illustrated in FIGS. 1, 2, 3, 4 and/or 5.

Block 1105 includes receiving information related to commercial activities at at least one of a plurality of locations, the information being collected at the at least one of the plurality of locations. Block 1110 includes transmitting the collected information for at least one of the plurality of locations to a display device. Block 1115 includes generating a notice when the collected information indicates a threshold condition is met for at least one of the commercial activities.

Figure 12:
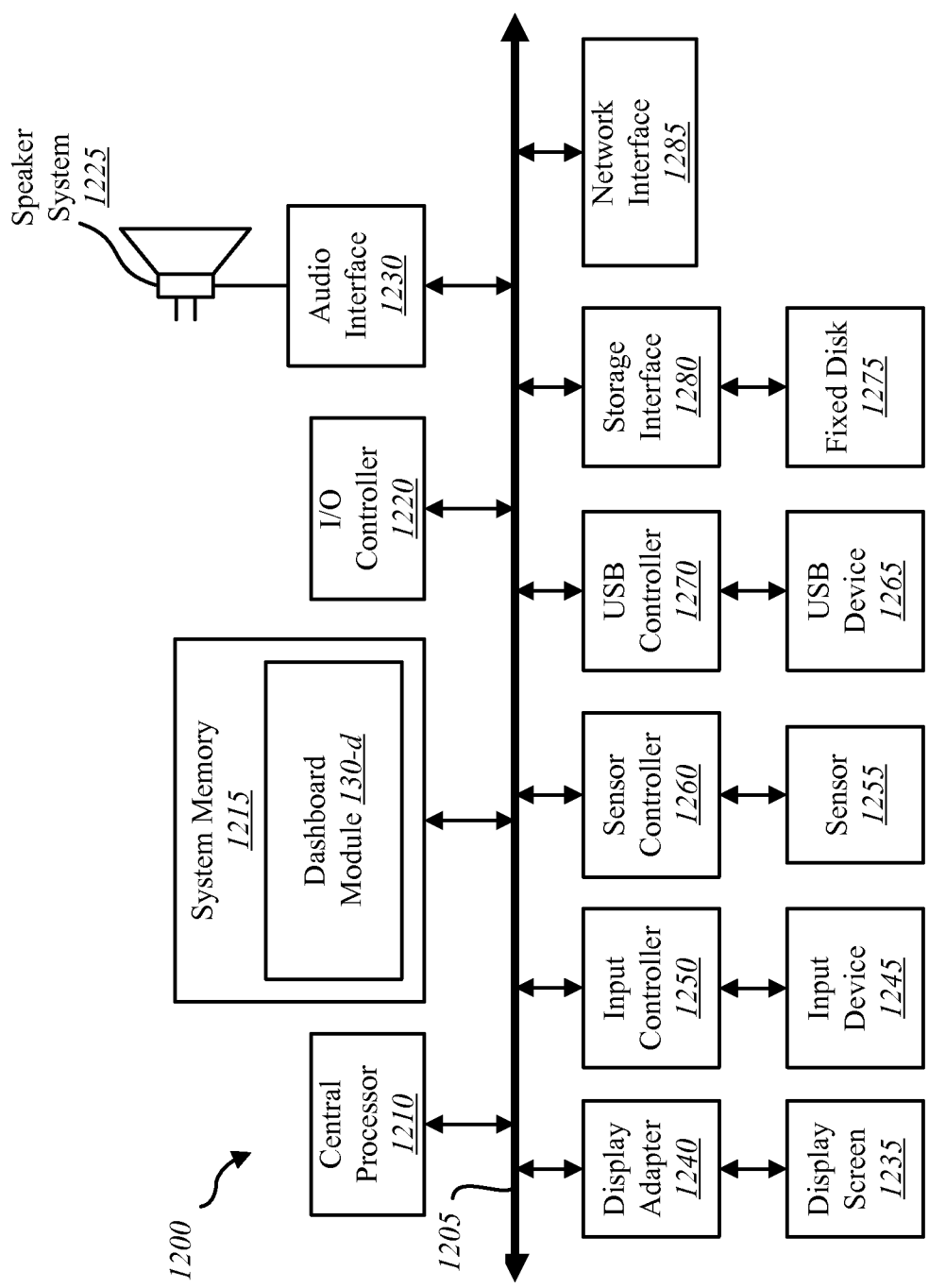
FIG. 12 depicts a block diagram of a computer system suitable for implementing the present systems and methods.

The method of FIG. 11 may also include displaying at least some of the collected information on a display device at each of the plurality of locations. The display device may be located at a location remote from at least some of the plurality of locations. The method of FIG. 11 may also include transmitting instructions for further commercial activities in response to the collected information FIG. 12 depicts a block diagram of a controller 1200 suitable for implementing the present systems and methods. The controller 1200 may be an example of device 105 illustrated in FIG. 1. In one configuration, controller 1200 includes a bus 1205 which interconnects major subsystems of controller 1200, such as a central processor 1215, a system memory 1220 (typically RAM, but which may also include ROM, flash RAM, or the like), an input/output controller 1225, an external audio device, such as a speaker system 1230 via an audio output interface 1235, an external device, such as a display screen 1235 via display adapter 1240, an input device 1245 (e.g., remote control device interfaced with an input controller 1250), multiple USB devices 1265 (interfaced with a USB controller 1270), and a storage interface 1280. Also included are at least one sensor 1255 connected to bus 1205 through a sensor controller 1260 and a network interface 1285 (coupled directly to bus 1205).

Bus 1205 allows data communication between central processor 1215 and system memory 1220, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the dashboard module 130-d to implement the present systems and methods may be stored within the system memory 1220. Applications (e.g., application 125) resident with controller 1200 are generally stored on and accessed via a non-transitory computer readable medium, such as a hard disk drive (e.g., fixed disk 1275) or other storage medium. Additionally, applications can be in the form of electronic signals modulated in accordance with the application and data communication technology when accessed via interface 1285.

Storage interface 1280, as with the other storage interfaces of controller 1200, can connect to a standard computer readable medium for storage and/or retrieval of information, such as a fixed disk drive 1275. Fixed disk drive 1275 may be a part of controller 1200 or may be separate and accessed through other interface systems. Network interface 1285 may provide a direct connection to a remote server via a direct network link to the Internet via a POP (point of presence). Network interface 1285 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1200 wirelessly via network interface 1285.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 12 need not be present to practice the present systems and methods. The devices and subsystems can be interconnected in different ways from that shown in FIG. 12. The aspect of some operations of a system such as that shown in FIG. 12 are readily known in the art and are not discussed in detail in this application. Code to implement the present disclosure can be stored in a non-transitory computer-readable medium such as one or more of system memory 1220 or fixed disk 1275. The operating system provided on controller 1200 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for monitoring at least one commercial activity, the method comprising:
   receiving information, via a wireless signal over a wireless communications network by a building automation controller of a security system of a building and/or premises, related to commercial activities at at least two of a plurality of locations associated with a business, the information being collected at at least two of the plurality of locations, wherein the building automation controller is located remotely from at least one of the plurality of locations;
   identifying, by the building automation controller, a person associated with the business and a display device associated with the person, based at least in part on the collected information;
   determining, by the building automation controller, a location of the person and the associated display device, and a current state of the associated display device, and one or more notification rules;
   automatically generating by the building automation controller, based at least in part on the determined location of the person and the associated display device, the current state of the associated display device, and the one or more notification rules, a notice comprising information associated with the at least two of the plurality of locations, to the person, based at least in part on the collected information indicating a threshold condition is met for at least one of the commercial activities, wherein generating the notice comprises causing the notice to be displayed on a graphical user interface (GUI) of the associated display device;
   automatically providing, based at least in part on the automatically generating, an interactive interface within the GUI to the person for inputting instructions at least in part via the GUI for controlling an aspect of the security system associated with the at least one of the commercial activities, the interactive interface comprising a data entry field, touch activation features, or both; and
   receiving, based at least in part on providing the interactive interface within the GUI, instructions for controlling the aspect of the security system associated with the at least one of the commercial activities, the instructions input by the person at least in part via the data entry field, touch activation features, or both of the automatically provided interactive interface;
   automatically controlling the aspect of the security system associated with the at least one of the commercial activities, based at least in part on the instructions input by the person at least in part via the data entry field, touch activation features, or both of the automatically provided interactive interface, wherein automatically controlling the aspect of the security system comprises automatically controlling lighting, controlling a thermostat, controlling at least one camera, or a combination thereof.

2. The method of claim 1, further comprising:
   receiving, by the building automation controller, the instructions inputted at least in part via the GUI, based at least in part on generating the notice to the person.

3. The method of claim 2, further comprising:
   transmitting the collected information for a select one of the plurality of locations to a local device located on site at the select one of the plurality of locations, the local device displaying the collected information.

4. The method of claim 1, wherein the collected information is stored in a database located remote from the plurality of locations.

5. The method of claim 4, wherein the notice comprises at least some information received from the database.

6. The method of claim 1, wherein the information is collected via a manual entering of information about at least one commercial activity.

7. The method of claim 1, wherein the collected information about at least one commercial activity is automatically detected.

8. The method of claim 1, wherein the at least one commercial activity comprises at least one of:
   consumer traffic;
   product inventory;
   duration of tasks;
   number of transactions; and
   number of employees.

9. The method of claim 1, further comprising:
comparing the collected information from one of the plurality of locations with collected information from at least one other of the plurality of locations; and
wherein the notice comprises separate pieces of information respectively associated with each of the one of the plurality of locations and the at least one other of the plurality of locations.

10. The method of claim 1, further comprising:
transmitting instructions to perform a separate commercial activity in response to the collected information indicating the threshold condition is met.

11. The method of claim 10, further comprising:
automatically generating instructions when the threshold condition is met.

12. A computer-program product for monitoring commercial activities, the computer-program product comprising a non-transitory computer-readable medium storing instructions executable by a processor to:
receive, via a wireless signal over a wireless communications network at a building automation controller of a security system of a building and/or premises, information related to commercial activities at at least two of a plurality of locations associated with a business, the information being collected at at least two of the plurality of locations, wherein the building automation controller is located remotely from the at least one of the plurality of locations;
identify a person associated with the business and a display device associated with the person, based at least in part on the collected information;
determine, by the building automation controller, a location of the person and the associated display device, and a current state of the associated display device, and one or more notification rules;
automatically generate a notice, based at least in part on the determined location of the person and the associated display device, the current state of the associated display device, and the one or more notification rules, comprising information associated with the at least two of the plurality of locations, to the person, based at least in part on the collected information indicating a threshold condition is met for at least one of the commercial activities, wherein generating the notice comprises causing the notice to be displayed on a graphical user interface (GUI) of the associated display device;
automatically provide, based at least in part on the automatically generating, an interactive interface within the GUI to the person for inputting instructions at least in part via the GUI for controlling an aspect of the security system associated with the at least one of the commercial activities, the interactive interface comprising a data entry field, touch activation features, or both;
receive, based at least in part on providing the interactive interface within the GUI, instructions for controlling the aspect of the security system associated with the at least one of the commercial activities, the instructions input by the person at least in part via the data entry field, touch activation features, or both of the automatically provided interactive interface; and
automatically control the aspect of the security system associated with the at least one of the commercial activities, based at least in part on the instructions input by the person at least in part via the data entry field, touch activation features, or both of the automatically provided interactive interface, wherein automatically controlling the aspect of the security system comprises automatically controlling lighting, controlling a thermostat, controlling at least one camera, or a combination thereof.

13. The computer-program product of claim 12, wherein information is received for at least three of the plurality of locations.

14. The computer-program product of claim 13, further comprising:
displaying at least some of the collected information on a local device located at at least one of the plurality of locations.

15. The computer-program product of claim 14, wherein displaying at least some of the collected information on the local device includes displaying collected information for only a location where the local device resides.

16. The computer-program product of claim 12, further comprising:
receiving the instructions inputted at least in part via the GUI, based at least in part on generating the notice to the person, to perform a further commercial activity in response to the collected information.

17. A building automation controller of a security system of a building and/or premises for monitoring at least one commercial activity, comprising:
a processor;
a memory in electronic communication with the processor; and
instructions stored in the memory, the instructions being executable by a processor to:
receive, via a wireless signal over a wireless communications network, information related to commercial activities at at least two of a plurality of locations associated with a business, the information being collected at at least two of the plurality of locations and wherein the building automation controller is located remotely from at least one of the plurality of locations;
identify a person associated with the business and a display device associated with the person, based at least in part on the collected information;
determining, by the building automation controller, a location of the person and the associated display device, and a current state of the associated display device, and one or more notification rules; and
automatically generate, based at least in part on the determined location of the person and the associated display device, the current state of the associated display device, and the one or more notification rules, a notice comprising information associated with the at least two of the plurality of locations, to the person, based at least in part on the collected information indicating a threshold condition is met for at least one of the commercial activities, wherein generating the notice comprises causing the notice to be displayed on a graphical user interface (GUI) of the associated display device;
automatically provide, based at least in part on the automatically generating, an interactive interface within the GUI to the person for inputting instructions at least in part via the GUI for controlling an aspect of the security system associated with the at least one of the commercial activities, the interactive interface comprising a data entry field, touch activation features, or both;
receive, based at least in part on providing the interactive interface within the GUI, instructions for controlling the aspect of the security system associated with the at least one of the commercial activities, the instructions input by the person at least in part via the data entry field, touch activation features, or both of the automatically provided interactive interface; and automatically control the aspect of the security system associated with the at least one of the commercial activities, based at least in part on the instructions input by the person at least in part via the data entry field, touch activation features, or both of the automatically provided interactive interface, wherein automatically controlling the aspect of the security system comprises automatically controlling lighting, controlling a thermostat, controlling at least one camera, or a combination thereof.

18. The building automation controller of claim 17, the instructions further executable by the processor to:

display at least some of the collected information on other display devices at each of the plurality of locations.

19. The building automation controller of claim 17, wherein the associated display device is located at a location remote from at least some of the plurality of locations.

20. The building automation controller of claim 17, the instructions further executable by the processor to:

receive the transmitted instructions, inputted at least in part via the GUI, based at least in part on generating the notice to the person, for further commercial activities in response to the collected information.

21. The method of claim 1, wherein the building automation controller is separate and distinct from the display device.

22. The method of claim 1, wherein the security system comprises a sensor, and the received information is collected based at least in part on the sensor, and wherein the building automation controller is wall-mounted.

23. The method of claim 1, wherein the GUI further comprises at least one visual notification representing the at least one of the commercial activities.

* * * * *